March 25, 1930.  M. R. TAYLOR  1,751,668
ARC WELDING
Filed April 18, 1927

INVENTOR.
Maurice R. Taylor
BY
Fay, Oberlin & Fay
ATTORNEYS.

Patented Mar. 25, 1930

1,751,668

UNITED STATES PATENT OFFICE

MAURICE R. TAYLOR, OF EAST CLEVELAND, OHIO, ASSIGNOR TO THE LINCOLN ELECTRIC COMPANY, OF CLEVELAND, OHIO, A CORPORATION OF OHIO

ARC WELDING

Application filed April 18, 1927. Serial No. 184,450.

The present improvements have more particular regard to methods of electric welding and of working metal by electricity in general, wherein an electric arc is struck between the part or parts to be fused and a carbon electrode that is moved relatively to such parts so as to cause the arc to traverse the work. Aside from the problem of controlling the "blow" of the arc to secure a uniform heating effect throughout the length of the weld, one of the difficulties encountered in this method of arc welding has been lack of ductility in the weld when completed. There is also a tendency for the molten metal that constitutes the welded joint to solidify in a succession of wavelets or ridges which detract from the appearance of the work.

The present invention is based on the discovery that both the ductility and appearance of a weld produced by use of an arc in the fashion described may be greatly improved by introducing a thin layer of a carbonaceous material. As a result of such use in the manner herein described, a weld of greatly increased ductility is obtained, one in fact that will permit two metal sheets welded together along their edges to be rebent along the seam until they lie in parallel relation without causing such seam to break or even crack. At the same time, the metal forming the welded joint is relatively smooth and free from pronounced ridges or depressions as well as interior structural defects.

To the accomplishment of the foregoing and related ends, the invention, then, consists of the steps hereinafter fully described and particularly pointed out in the claims, the annexed drawing and the following description setting forth in detail one improved method of carrying out the invention, such disclosed means, however, constituting but one of the various ways in which the principle of the invention may be used.

In said annexed drawing:—

Figure 1:
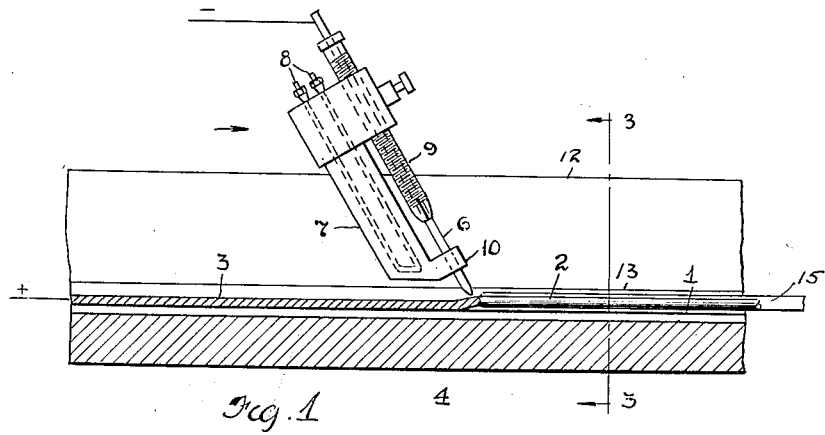
Figure 2:
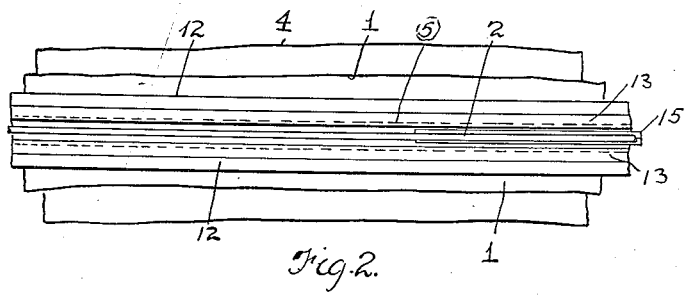
Figure 3:
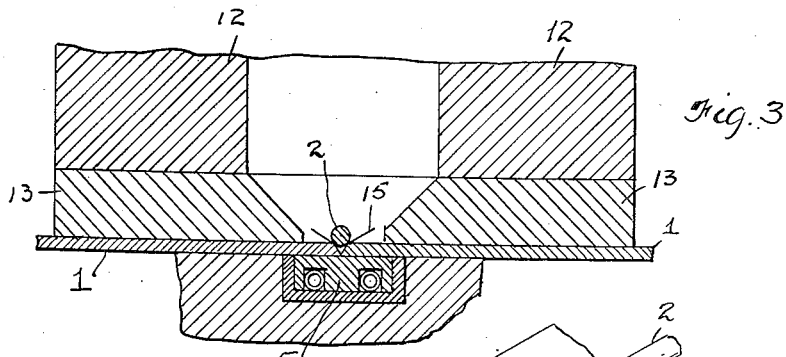
Figure 4:
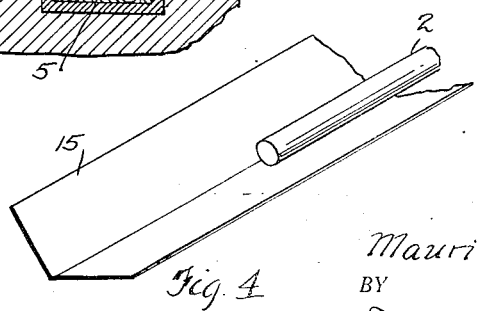

Fig. 1 is a more or less diagrammatic representation of an arc welding mechanism or apparatus arranged to operate in accordance with my present improved method, such apparatus being shown as applied to the welding of a longitudinally extending seam between the edges of two juxtaposed plates or sheets of metal; Fig. 2 is a plan view of the same; Fig. 3 is a transverse section thereof, the plane of the section being indicated by the line 3—3, Fig. 1; and Fig. 4 is a broken perspective view of a strip of paper such as constitutes one practical element in the carrying out of the method in question.

As indicated, in the arrangement illustrated in the several figures of the drawing, the work is shown as consisting of two sheets 1, 1, which are disposed with the edges thereof that are to be joined together in substantially abutting relation. Sufficient space, however, may be left between such edges or the latter may be slightly beveled so that a filler strip or wire 2 may be inserted therebetween, or such strip may be placed so as simply to rest upon the seam. This element 2 will usually be of the same material, i. e. iron or steel, as the metal of the sheets, but may if desired contain special alloying constituents or even be of a different metal entirely, so far as the practice of the present invention is concerned. The object of the illustrated operation, it will be understood, is to melt down such element 2 and interfuse the same with the edges of the sheets 1, 1, so that the resultant seam 3, as shown at the left-hand end of Figs. 1 and 2, will be of substantially the same thickness as the sheets and possess a strength and ductility equal to, if not greater than, that possessed by such sheets.

As shown, the sheets 1 with such filler element 2 interposed between their abutting edges are preferably supported on a bed or anvil 4, which will preferably be of steel, except for a strip 5 of copper, which is disposed directly beneath the seam and thus below the line of the weld. The welding, as previously indicated, is accomplished by means of an electric arc, a carbon electrode 6 being employed, and the welding circuit including such carbon, the filler element 2 and the bed or anvil 4 or rather the strip 5 which, as aforesaid, forms in effect a part thereof. The holder 7 for such electrode, shown in side elevation in Fig. 1, is of a special design that forms no part of the present invention, such holder being characterized, among other things, by having connections 8 for circulating a cooling liquid through the body thereof. It will be observed, however, that while the electrode is adjustably supported in the holder body by means of an adjustable chuck 9, such body is formed at its extreme lower end with a projecting portion 10, through which the electrode passes and wherewith it is in electrical contact, so that the current is required to pass through only a very short section of the electrode, viz, that portion which extends beyond the projection 10 in question, the current path from this point on being through the body of the holder which is of copper or equivalent conducting material.

For the purpose of clamping the sheets 1, 1, onto the supporting bed or anvil 4, I employ two bars 12, 12, that are laid on the work, one on each side of the seam or joint to be welded. These bars are of such length in themselves, or such additional pressure may be applied thereto, as to cause them to retain the edges of the sheets that constitute the work securely in place upon such bed and they will preferably be of metal or equivalent conducting material. Ordinarily the main body of these bars will be of steel, each bar being provided along its lower edge with a base 13 in the form of a strip of copper or equivalent metal of relatively high electrical conductivity that is fixedly secured to the steel bar as by welding.

In employing the foregoing apparatus to carry out the present improved method, a layer of carbonaceous material, and preferably material containing carbon and hydrogen, is provided along the abutting edges of the sheets 1 and the filler rod or wire 2. This material may be applied as a coating, conveniently for instance of a hydrocarbon, as paraffine, or of a carbohydrate, as starch, flour and molassses, or of a fat or soap. In some cases I use cellulose, and advantageously this may be in the form of a strip or sheet of paper. The sheet will preferably be of the trough-like form shown in Fig. 4, i. e. of V-shape in cross section, this form being readily produced by simply folding the sheet lengthwise, so that when laid along the seam between the bases 13 of the clamp bars 12, such strip will naturally align itself with the latter and the seam. The sheet in this form will further assist in properly locating the filler rod or strip 2, as will be readily understood.

In operation, the distance of the lower end of the carbon electrode 6 from the filler rod being properly adjusted, the current connections being established, an arc will be struck between such electrode on the one side and such rod and the adjacent edges of the sheets 1, 1, on the other. At the same time the holder 7 is caused to move by suitable means (not shown) in the direction indicated by the arrow in Fig. 1, along the prescribed path at properly regulated speed to insure the complete fusion of the rod and such edges.

The arc thus struck and maintained during the movement of the electrode as it traverses the seam to be welded will penetrate the layer of carbonaceous material or the interposed strip of paper 15 and the latter will be gradually consumed as the operation progresses. The exact manner in which such carbonaceous material functions is not readily explainable, but the effect upon the arc and the resulting weld is striking and obvious even to the casual observer. In the first place, the arc evinces much less tendency to lag or "stick", as well as to shift irregularly from one point to another on the work, but follows the line of the seam as defined by the superposed filler rod or wire, steadily reducing the latter and the adjacent edges of the sheets 1 to desired molten condition. In the second place, there is much less boiling of the molten metal and the resultant weld congeals into a smooth, slightly rounded body of metal without any pronounced ridges or depressions such as have heretofore characterized a welded joint formed by means of an arc of the type in question. Finally, the finished weld, as hereinbefore stated, is found upon subjection to the most severe tests to be of surprising ductility and capable of resisting strains which even the sheets themselves are incapable of withstanding. In the absence of any present known explanation of the effects, I here content myself with setting forth the observed results.

Where paper is used, the particular form given the sheet may of course be varied. A flat sheet of paper may simply be laid along the line of the seam and clamped down along with the sheets by the bars 12 and the filler rod or wire 2 then placed in proper position thereover. So too the paper may be wrapped around the filler rod before the latter is thus placed in position. Likewise in using materials capable of forming a coating, these may be applied to the edges, or to the filler rod, or to both, as the particular circumstances may render most desirable.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. In metal working by electricity, the steps which consist in establishing an arc between a suitable electrode and a work surface provided with a thin layer of a continuous non-granular carbonaceous material active as a secondary electrode, and relatively moving such work and electrode along the line thereof.

2. In metal working by electricity, the steps which consist in establishing an arc between a suitable electrode and a work surface provided with a layer of material containing carbon and hydrogen, and relatively moving such work and electrode as required.

3. In metal working by electricity, the steps which consist in supplying to the work surface a thin layer of a continuous nongranular carbonaceous material, establishing an arc between a suitable electrode and the work surface, and relatively moving such work and electrode to follow the line of such carbonaceous material.

4. In a method of welding together the edges of metal sheets, which consists in disposing such sheets with the edges to be welded in approximately abutting relation, and then interfusing such edges by passing an electric arc therealong; the step which consists in supplying to the work surface a layer of carbonaceous compound.

5. In a method of welding together the edges of metal sheets, which consists in disposing such sheets with the edges to be welded in approximately abutting relation, providing an excess of metal adjacent such edges, and then melting such excess metal and interfusing the same with such edges by passing an electric arc longitudinally along the latter; the step which consists in supplying to the work surface a layer of material containing carbon and hydrogen.

6. In a method of welding together the edges of metal sheets, which consists in disposing such sheets with the edges to be welded in approximately abutting relation, placing a strip of metal along such edges, and then melting such strip and interfusing the same with such edges by passing an electric arc along such strip; the step which consists in supplying to the work surface a layer of paper.

7. In a method of welding together the edges of metal sheets, which consists in disposing such sheets with the edges to be welded in approximately abutting relation, placing a strip of metal along such edges, and then melting such strip and interfusing the same with such edges by passing an electric arc along such strip; the step which consists in supplying to the work a sheet of paper, the latter being of trough-like form and such strip of metal lying thereon and holding the same in place.

Signed by me this 11th day of April, 1927.

MAURICE R. TAYLOR.